(12) United States Patent
Rangarajan et al.

(10) Patent No.: US 10,705,561 B1
(45) Date of Patent: Jul. 7, 2020

(54) CONFIGURATION OF A CLOCK DISTRIBUTION SYSTEM FOR AN INTEGRATED CIRCUIT

(71) Applicant: Arm Limited, Cambridge (GB)

(72) Inventors: Thanunathan Rangarajan, Cambridge (GB); Ronald Cron, Fresnes (FR); Sudeep Karkada Nagesha Holla, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/351,611

(22) Filed: Mar. 13, 2019

(51) Int. Cl.
*G06F 1/10* (2006.01)
*G06F 1/324* (2019.01)
*G06F 1/06* (2006.01)
*G06F 1/08* (2006.01)

(52) U.S. Cl.
CPC .................. *G06F 1/10* (2013.01); *G06F 1/06* (2013.01); *G06F 1/08* (2013.01); *G06F 1/324* (2013.01)

(58) Field of Classification Search
CPC ... G06F 1/10; G06F 1/324; G06F 1/06; G06F 1/08; G06F 1/04; G06F 2217/62
See application file for complete search history.

(56) References Cited

U.S. PATENT DOCUMENTS

2019/0097637 A1* 3/2019 Hutton .................. H03K 5/135

* cited by examiner

*Primary Examiner* — Jung Kim
(74) *Attorney, Agent, or Firm* — Nixon & Vanderhye P.C.

(57) ABSTRACT

A method for configuring a clock distribution system for an integrated circuit involves receiving an indication of frequencies of clock signal to supply to devices on the integrated circuit, selecting a configuration for the clock distribution system based on the frequencies required by the devices and an estimated power consumption, and providing an indication of the selected configuration for configuring the clock distribution system.

15 Claims, 12 Drawing Sheets

CONFIGURATION OF A CLOCK DISTRIBUTION SYSTEM FOR AN INTEGRATED CIRCUIT

BACKGROUND

Technical Field

The present technique relates to the field of integrated circuits. More particularly, the invention relates to clock distribution.

Technical Background

An integrated circuit may include at least one device which operates in response to a clock signal. A clock distribution system may be provided to distribute a one or more clock signals to such devices with the result that each device is provided with a clock signal (multiple devices could share the same clock signal, or could receive different clock signals). The clock distribution system may include clock signal generators to produce clock signals and clock distribution components through which the clock signals pass before arriving at the devices. Devices on the integrated circuit may be designed to operate at specific frequencies or within a specific range of frequencies. The components of the clock distribution system may be configurable in a number of ways, resulting in variation of the frequency of the clock signals provided to each device.

SUMMARY

At least some examples provide a method for configuring a clock distribution system for an integrated circuit, the method comprising the steps:
receiving a demand indication indicative of demanded clock frequencies for clock signals to be supplied to one or more devices of the integrated circuit;
selecting a selected configuration of the clock distribution system in accordance with the demand indication; and
providing a configuration indication for configuring the clock distribution system according to the selected configuration; in which
when a plurality of configurations of the clock distribution system are able to satisfy the demand indication, the selected configuration is selected from said plurality of configurations based on an estimated power consumption associated with said plurality of configurations.

At least some examples provide a non-transitory computer readable medium storing instructions that when executed by a computer system cause the computer system to perform the above-mentioned method.

At least some examples provide an apparatus for configuring a clock distribution system for an integrated circuit, the apparatus comprising:
receiving circuitry to receive a demand indication indicative of demanded clock frequencies for clock signals to be supplied to one or more devices of the integrated circuit;
selecting circuitry to select a selected configuration of the clock distribution system in accordance with the demand indication; and
output circuitry to provide a configuration indication for configuring the clock distribution system according to the selected configuration; wherein
when a plurality of configurations of the clock distribution system are able to satisfy the demand indication, the selecting circuitry is configured to select the selected configuration from said plurality of configurations based on an estimated power consumption associated with said plurality of configurations.

At least some examples provide a method of generating a digital representation of a design for an integrated circuit, the method comprising the steps:
identifying clock signal frequencies to be supported by one or more devices of the integrated circuit; and
selecting which clock system components are to be included in a clock distribution system of the integrated circuit, the clock distribution system having a plurality of selectable configurations; and
outputting the digital representation including a representation of the clock distribution system having the selected clock system components; in which:
the clock system components are selected based on an analysis of an extent of overlap between respective subsets of clock frequencies supported for a given device in a plurality of configurations of the clock distribution system.

At least some examples provide a non-transitory computer readable medium storing instructions that when executed by a computer system cause the computer system to perform the above-mentioned method.

Further aspects, features, and advantages of the present technique will be apparent from the following description of examples, which is to be read in conjunction with the accompanying drawings.

DESCRIPTION OF EXAMPLES

Figure 1:
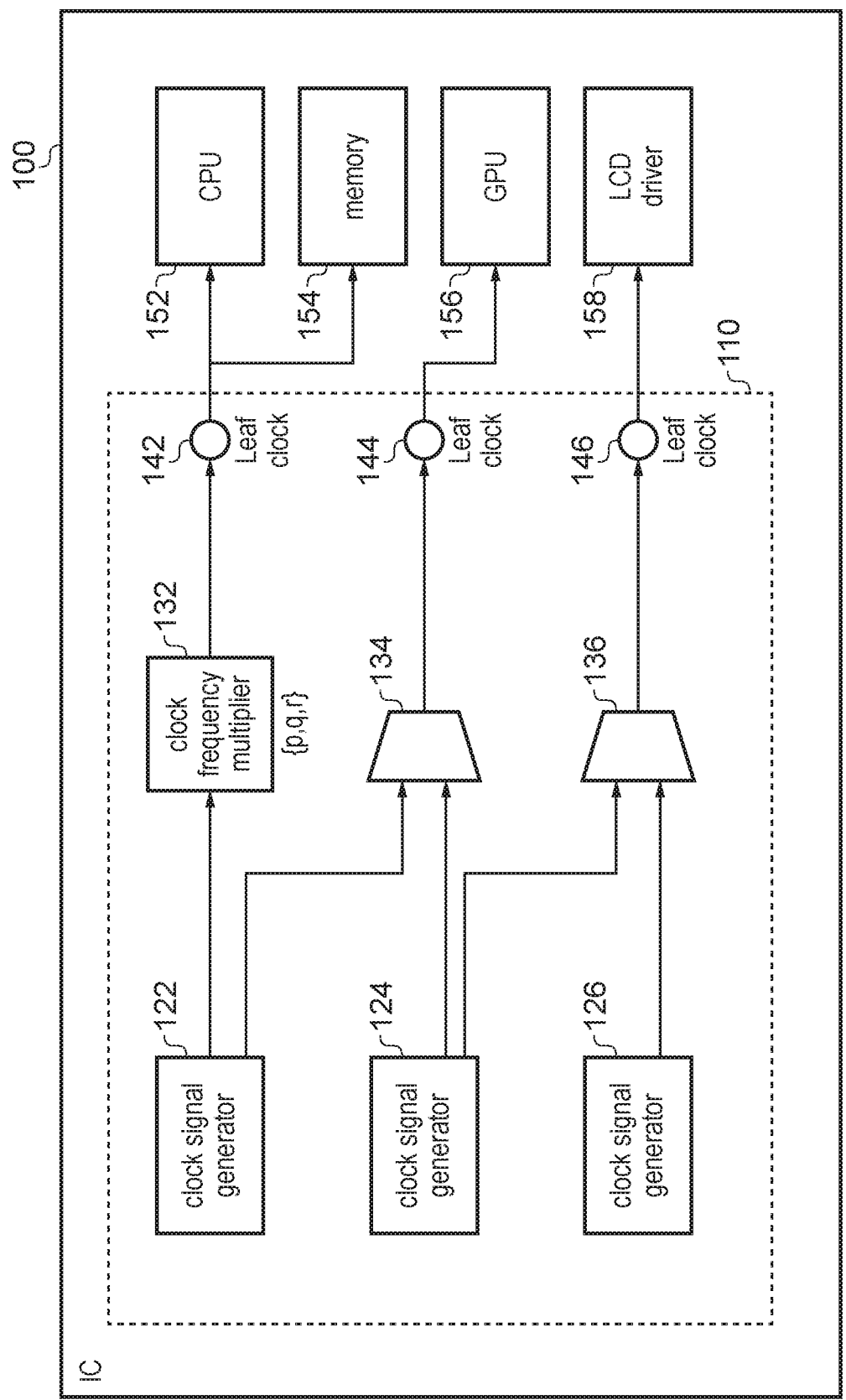
FIG. 1 schematically illustrates an example of an integrated circuit having a clock distribution system.

Some specific examples are described below. It will be appreciated that the invention is not limited to these exact examples.

An integrated circuit such as a system-on-chip (SoC) may have a clock distribution system to provide devices on the integrated circuit with clock signals. The clock distribution system may include a number of clock system components such as clock signal generators to generate clock signals, clock signal multipliers/dividers to output a clock signal having a frequency multiplied/divided by a given factor compared to the frequency of clock signal input, and multiplexers/demultiplexers to select between paths along which a clock signal can travel. These components may be individually configurable so as to have different effects on the frequency, phase, or other characteristics of the clock signals. By configuring the components of a clock distribution system in different ways, different configurations of the clock distribution system can be obtained resulting in different frequencies of clock signals being supplied to devices on an integrated circuit.

Devices on an integrated circuit may require a clock signal of a certain frequency or range of frequencies to operate, and in response to an indication of these frequencies, a configuration, or set of component settings of the clock distribution system, can be selected so as to provide the devices with clock signals that satisfy the demand indication. If there are multiple devices being supplied with respective leaf clock signals, then the demand indication may specify respective demands on the clock requirements for each leaf clock signal (e.g. the demand may specify different frequencies required for different devices). The demand indication could in some examples be derived from a combination of separate demand requests provided individually for each device.

The inventors recognised that in practice, there may be more than one configuration of the clock distribution system that satisfy the demand indication. These may correspond to different sets of settings for the clock system components that all result in frequencies provided to the devices in accordance with the demand indication. The different configurations that satisfy the demand indication may be associated with different power consumptions.

By selecting the configuration to use based on an estimate of the power consumption associated with the configurations that satisfy the demand, a more energy efficient configuration can thus be chosen. Hence, by selecting the configuration of the clock distribution system in this way, the devices can be supplied with a frequency according to the demand indication and the overall energy efficiency of the clock distribution system and the integrated circuit can be improved. If the demand indication specifies a demand associated with two or more leaf clock signals to be supplied with respective devices, then the selected configuration may be a configuration which is able to satisfy the demand of each of those devices.

In some examples, the configuration indication may indicate that at least one of the clock system components is to be put into a power-saving state. This may advantageously occur when components in the selected configuration are indicated as being unused. Accordingly, components of the clock distribution system may be switched off or be put into a mode in which they consume less power than they would in operation. For example, clock signal generator components typically consume a large amount of power and by indicating that these components can be switched off, the consumption of energy by components that are not being used can be reduced.

The configuration selected for use may be the one with the lowest estimated power consumption. This advantageously leads to the largest estimated power saving compared with other configurations that satisfy the demand indication. The selection of the configuration may also be based on other factors such as the physical proximity of clock system components to devices, or the length of time for which it is expected that it is possible to keep a given clock system component in the power saving state (e.g. it may not be worth powering a clock system component down, even if not currently required, if it is expected to be needed soon). Therefore, in some examples, the selected configuration may not be the one with the lowest estimated power consumption. However, in general by considering the estimated power consumption of the different clock distribution system configurations that could satisfy the demand indication, this can allow the selection to be biased towards selecting a configuration with lower estimated power consumption than at least one other configuration which could satisfy the demand indication.

There are a number of ways in which the estimated power consumption can be calculated. According to some configurations, the estimated power consumption is based on the number of clock signal generators indicated as being used according to the configuration. Since the clock signal generators typically consume a large amount of power compared to other components, this may represent a good estimate of the total power consumption of a configuration and is also relatively straightforward to evaluate which may reduce the processing required to select a configuration and hence increase the speed at which the clock distribution system can be configured.

With an estimated power consumption based on the number of clock signal generators in use, according to some examples of the present technique, the configuration with the fewest generators in use may be selected. The configuration indication may then indicate that the unused clock signal generators are to be put into a power-saving state. For example, the configuration may indicate a configuration which allows the greatest number of generators can be switched off while satisfying the demand indication, thus providing a convenient way of configuring the clock distribution system so as to be more energy efficient.

Instead of, or in addition to, basing the estimated power consumption on a number of clock signal generators in use, some or all of the clock system components may have an associated component power cost to indicate information about the power consumption of the component. These power costs may be individually assigned to components or alternatively, all components of the same type may have the same component power cost. Also, a given clock system component which is able to be configured in two or more different configuration settings may have a different power cost assigned to each configuration setting. The estimated power cost of a configuration may then be derived from the sum of the component power costs of the components indicated as being used, considering the particular configuration settings assigned to those components according to that configuration. In this way, an accurate estimate of the power consumption of configurations may be obtained and a configuration with the best estimated energy efficiency selected.

To enable the configuration of the clock distribution system according to the selected configuration, the configuration indication can indicate settings for clock system components providing instructions as to how the components are to be configured. For example, the settings may indicate which frequency of clock signal a clock signal generator or phase-locked loop (PLL) is to supply, a factor by which a clock signal multiplier/divider should multiply/divide the frequency of a clock signal, or a clock signal path that a multiplexer/demultiplexer is to select. This information can then be passed to the clock system components to implement the configuration.

The clock distribution system may include a plurality of clock system components, such as clock signal generators to supply clock signals to the system and clock distribution components such as a multiplexer or demultiplexer to select between clock signal paths, a phase-locked loop (PLL) to synthesise or alter the frequencies or phases of clock signals, a clock frequency multiplier or divider to output a clock signal at a given multiple of the frequency at which it is received. A multiplexer may comprise a clock system component which selects which of the signals from two or more input signal paths is to be provided to an output signal path. A demultiplexer may be a clock system component which selects which of two or more output signal paths is to be provided with a signal received from an input signal path.

It may be the case that the requested frequencies indicated by the demand indication specify frequencies outside of which the devices on the IC are not able to operate and so it can be considered that each configuration of the clock distribution system either satisfies the demand indication or does not satisfy the demand indication.

Alternatively, the requested frequencies of the devices may represent preferred operational frequencies with the devices capable of operating outside of this, e.g. within a tolerance range outside of the specified frequencies. Accordingly, in some examples, configurations can satisfy the demand indication to different degrees. A first configuration could provide frequencies that match precisely with the requested frequencies of the devices while a second configuration satisfies the demand indication but provides frequencies that lie at the edge of an indicated tolerance region. Counter-intuitively, the inventors have recognised that it may be beneficial to select a configuration that less closely satisfies a demand indication but that is associated with a lower power consumption. In this way, the configuration with the better energy efficiency may be selected and so the clock distribution system may consume less power overall.

The ability of more than one configuration to satisfy the demand indication may be due to the availability of two or more configurations able to supply a particular device with the same frequency of clock signal. If a device demands a certain frequency and more than one configuration is capable of supplying this frequency, depending on the other devices' demanded frequencies and the frequencies available to be supplied to them, this may signal that more than one configuration can satisfy the demand indication. This can be considered as an overlap in the supported frequencies for a given device according to different configurations. While a clock distribution system which supports such overlaps in the frequency ranges supported for a given device in different configurations might be seen as incorporating unnecessary redundancy in the clock distribution system, the inventors recognised that actually such support for overlapping frequency ranges supported in different configurations is beneficial as it provides more flexibility to save power by adjusting which particular clock distribution paths are used to supply the clock frequencies required to support the current demands required by one or more devices.

The present technique may be implemented in software as part of an operating system (OS). In this case, software executing on the integrated circuit could assess the expected frequency demands of the devices of the integrated circuit and select how to configure the clock distribution system based on the estimated power costs of any configurations able to satisfy the demand.

Alternatively, the configuration of the clock system may be controlled by a system control processor (SCP), which may be a separate processor from an application processor. For example, the SCP could execute device firmware stored in a read only memory which is built into the overall integrated circuit platform and is not overwritable. Alternatively, the software controlling the SCP could be in a writable region of memory, but access to that region could be restricted to privileged software. Providing a separate SCP can make the development of the OS or other software drivers more efficient, as the SCP may provide an abstract interface to the OS and/or software drivers through which the supported clock rates are communicated by the SCP and through which the OS/software drivers may provide the demand indication to the SCP to indicate a request for particular frequencies of clock signals. By executing the technique separately from general-purpose software, the clock configuration actions can be offloaded from the application processors running the OS and software drivers, leading to improved performance of the application software.

Alternatively, dedicated hardware logic may be provided for receiving the demand indication and selecting the configuration of the clock distribution system based on the estimate of the power consumption in any configurations able to support the demand.

As discussed above, the demand indication may be come in one of a number of forms, or may comprise indications according to a combination of forms. The demand indication may be indicative of one or more particular requested frequencies for devices or may indicate one or more ranges of frequencies. The frequencies may be indicated such that there is a tolerance of allowed frequencies around the specified frequencies. For example, it may be tolerable to provide a frequency within 5% of the frequency specified. By providing a range of frequencies that can be supplied by the clock distribution system to a device, there is more flexibility over how the clock distribution system can be configured, and so there may be more scope to choose a configuration that consumes less power. Alternatively, the demand indication may indicate a particular state from which the requested frequencies for the device can be determined, e.g. the demand indication may indicate that the integrated circuit is to be put into an idle state for which the corresponding requested frequencies are known. For example, the demand indication could simply indicate which devices need to be active, and a pre-stored table or data structure indicating the frequencies required to support each device could be looked up based on the devices indicated as being active, to identify the demand required. Hence, it will be appreciated that the demand indication may be any information which enables identification of which frequencies are required by any active devices, but does not necessarily need to identify those frequencies explicitly in the demand indication.

The configuration of the clock distribution system based on the estimated power consumption could be triggered in a number of ways. For example, the reconfiguration of the clock distribution system could be performed in response to a start-up event or reset event of a computing device having the integrated circuit. Additionally or alternatively, the reconfiguration could be performed at periodic intervals so as to regularly check whether a more energy efficient configuration could be employed. The period at which to perform the configuration operation may be decided based on a compromise between the processing overhead needed to select a configuration and the energy that could be saved in the clock distribution system by performing the present technique. The technique could also be performed in response to certain trigger events such as a transition to a battery-operated mode or a power-saving mode in which the power consumption of the clock distribution system may be of increased concern.

As discussed above, when there are multiple configurations of a clock distribution system that are capable of satisfying a demand indication, a selection can be made to choose an energy efficient one. With a clock distribution system arranged to have large amounts of overlap in the frequencies supported for a given frequency for devices, there is more choice as to the configurations that can be chosen and so there is more scope to choose one that consumes less power. Therefore, a digital representation of a design for an IC can advantageously be generated by selecting clock system components to be included based on an analysis of an extent of overlap between subsets of clock frequencies supported in different configurations. It may appear counter-intuitive since it would be expected that it would be beneficial to reduce the overlap between configurations and provide only a minimal set of components needed to satisfy the devices' demands. However, by selecting clock system components so as to have an overlap in the supported frequencies for devices according to different configurations, more scope is available for choosing an energy efficient configuration that satisfies a demand indication and hence a more energy efficient IC can be designed.

FIG. 1 illustrates an example of an IC 100 having a clock distribution system 110. The IC 100 shown has four devices, a central processing unit (CPU) 152, memory 154, a graphics processing unit (GPU) 156, and an LCD driver 158 however it is understood that other embodiments may have a different arrangement with alternative devices and/or arrangements of components.

The clock distribution system 110 of FIG. 1 comprises clock system components including clock system generators and clock distribution components. The clock distribution system 110 has three clock system generators 122, 124, 126, each of which are capable of producing a clock signal. The clock signal is then transmitted along clock signal paths via the clock system distribution components before being fed to the devices. The output clock signals are fed to the devices from leaf clocks 142, 144, 146. A leaf clock may be connected to a single device as in the case of leaf clocks 144, 146 or a single leaf clock may provide a clock signal to more than one device as in the case of leaf clock 142. When considering the configurations of a clock distribution system in response to demand for clock signals for the devices, it can be instructive to consider the demand at each leaf clock and the clock signals capable of being delivered to each leaf clock. This approach will be taken below.

In the example embodiment shown in FIG. 1, the clock signal emitted by clock signal generator 122 travels down the clock signal paths to clock frequency multiplier 132 and to multiplexer 134. The clock signals emitted by clock signal generator 124 travel down the clock signal paths to multiplexer 134 and to multiplexer 136 and the clock signals emitted by clock signal generator 126 travel down the clock signal paths to multiplexer 136.

It will be appreciated that alternative arrangements of clock distribution components and clock signal generators are possible. For example, according to different embodiments, more or fewer clock system components could be provided, the clock signals may travel through more or fewer clock signal distribution components between being transmitted from a clock signal generator and arriving at a leaf clock, or the clock distribution system may include different types of components.

The clock signals provided at the leaf clocks and hence delivered to the devices can be altered by selecting between different configurations of the clock distribution system. The clock signal generators may be capable of supplying clock signals at different frequencies, for example, each clock signal generator may have a range of frequencies of clock signal it can output. Further the multiplexers may be capable of selecting between different paths. According to the example embodiment of FIG. 1, multiplexer 134 is configured to be able to select between the control path signals from clock signal generators 122 and 124 to deliver to leaf clock 144. Clock frequency multiplier 132 of FIG. 1 is configured to receive an input clock signal originating from clock signal generator 122 and output a clock signal at a frequency that is a selected multiple p, q or r of the input clock signal frequency. If clock signal multiplier 132 receives a clock signal with a frequency X, clock signal multiplier 132 is configured to output a clock signal with a frequency of pX, qX, or rX.

Accordingly the frequencies provided to the leaf clocks can vary in dependence on the configuration selected for the clock distribution system 110.

Figure 2:
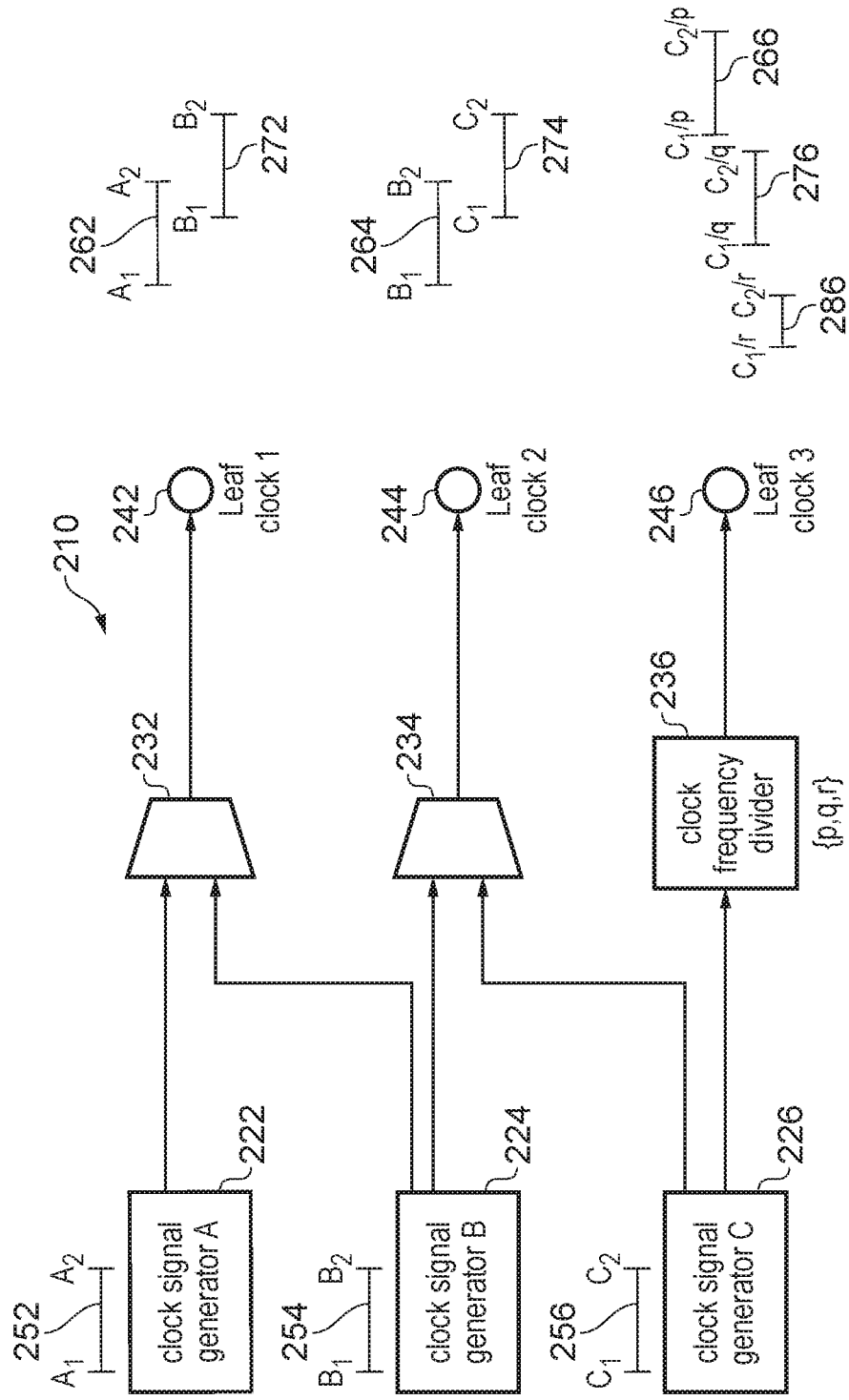
FIG. 2 illustrates a clock distribution system and its supported frequency ranges.

FIG. 2 illustrates an example embodiment of a clock distribution system according to another arrangement. The clock distribution system 210 illustrated in FIG. 2 comprises three clock signal generators A 222, B 224, and C 226; multiplexers 232 and 234; and a clock frequency divider 236. Each of the clock signal generators 222, 224, 226 are configured to be able to output a frequency within a given range 252, 254, 256 depicted next to the clock signal generator. For example, clock signal generator 222 is capable of delivering a clock signal with a frequency A in the range $A_1$ to $A_2$ 252, clock signal generator 224 is able to generate a clock signal with a frequency B in the range $B_1$ to $B_2$ 254, and clock signal generator 226 is able to generate a clock signal with a frequency C in the range $C_1$ to $C_2$ 256. Clock frequency divider 236 is configured such that when provided with an input clock signal of frequency Y, it outputs a clock signal of frequency of Y/p, Y/q, or Y/r.

By configuring the clock distribution system 210 in different ways, the frequency of clock signal provided to each leaf clock 242, 244, 246 can be altered. The configurations may differ in the selected frequency to be output by the clock signal generators 222, 224, 226, the path selected for the multiplexers 232, 234, or the choice of factor by which the frequency should be divided at the clock frequency divider 236.

At each leaf clock 242, 244, 246, there is a set of supported frequencies that can be provided to it by selecting an appropriate configuration. The supported frequencies are illustrated in FIG. 2 next to each leaf clock. For example, leaf clock 1 242 supports frequencies in the union of the ranges $[A_1, A_2]$ 262 and $[B_1, B_2]$ 272. This corresponds to the multiplexer 232 selecting a clock signal produced at clock signal generator A 222 or clock signal generator B 224, and the choice of clock signal frequency produced at that clock signal generator. Similar ranges 264, 274, 266, 276, 286 are shown for leaf clocks 2 244 and 3 246 depicting the clock signal frequencies that can be provided thereto.

The selection of which configuration of the clock distribution system 210 of FIG. 2 is to be used will now be described with reference to FIGS. 3A-3C. In this example, the estimated power consumption is based on the number of clock signal generators indicated as being in use such that the number of clock signal generators that can be put into a power-saving state is to be maximised. This may represent a quick method of determining the configuration to select.

Figure 3A:
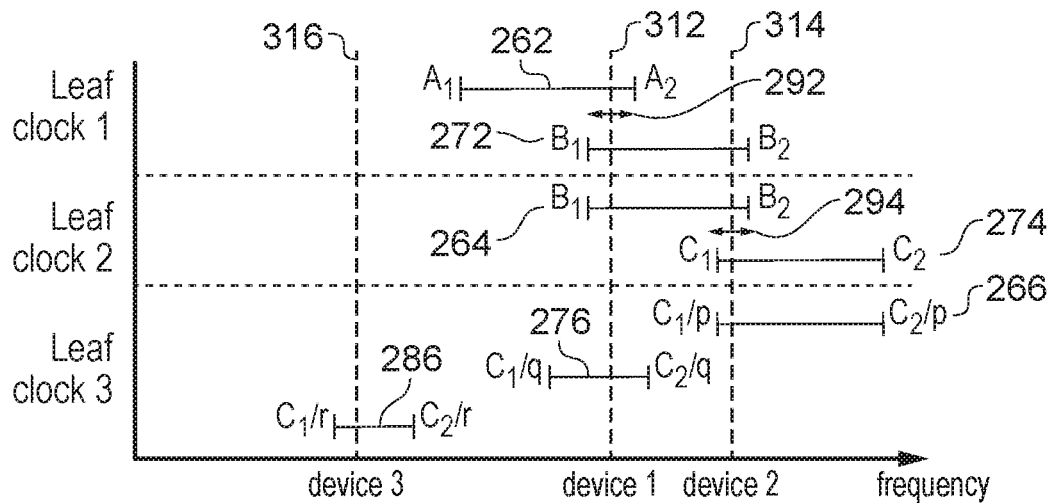
FIGS. 3A-3C illustrate an example of selection of a configuration in the clock distribution system of FIG. 2.

FIG. 3A illustrates the frequencies supported by each leaf clock, showing them relative to each other. The horizontal axis represents the frequency with the vertical axis divided to show the frequencies associated with each leaf clock.

Also shown is an example demand indication. The vertical lines 312, 314, 316 depict frequencies to be supplied to the devices. For example, line 312 indicates that device 1 is to be provided with a clock signal having a frequency given by the value of the frequency at which line 312 intersects the horizontal axis. Similar demand indications are presented for devices 2 and 3.

It will be appreciated that more than one configuration of the clock distribution system 210 shown in FIG. 2 is capable of providing the leaf clocks with the frequencies of clock signal demanded by the devices. This arises from the presence of overlaps 292, 294 in the range of frequencies supported at each leaf clock according to different configurations. For instance, overlap 292 arises in the frequency range $B_1$ to $A_2$ because the frequencies in that range 292 can be provided to leaf clock 1 with the multiplexer 232 set to deliver clock signals from either clock signal generator A 222 or clock signal generator B 224. Similarly, there is an overlap 294 in the frequency ranges supported for leaf clock B in the configurations supplied based on clock generator B or C respectively, with the overlap 294 being in the frequency range $C_1$ to $B_2$.

Figure 3B:
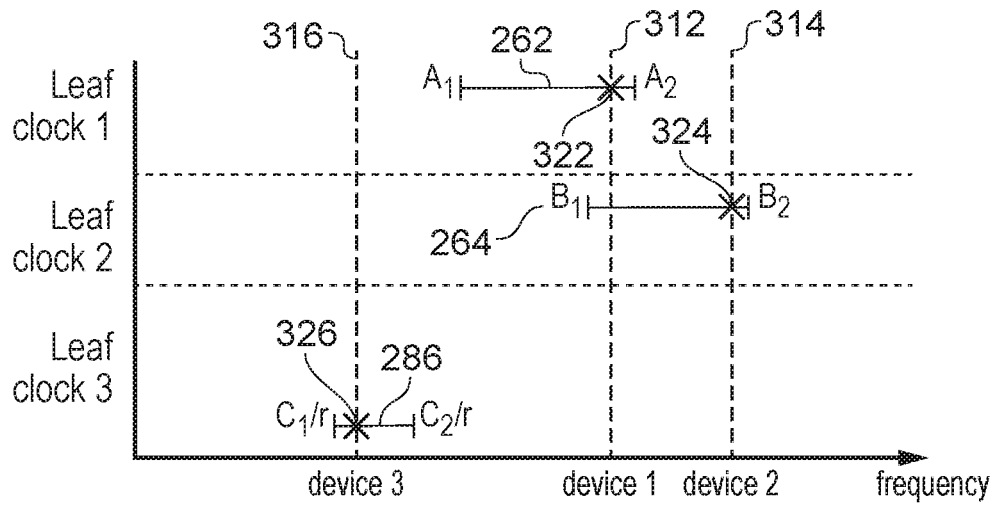

FIG. 3B shows one configuration which can satisfy the demand. Crosses 322, 324, 326 are used to indicate a selection of a frequency within a range, and ranges from which a selection has not been made have been omitted. As such it can be seen that according to the configuration depicted in FIG. 3B, multiplexer 232 has selected a clock signal path such that leaf clock 1 242 is provided with a clock signal generated by clock signal generator A 222, multiplexer 234 has selected a clock signal path such that leaf clock 2 244 is provided with a clock signal generated by clock signal generator B 224, and clock frequency divider 236 is configured to divide its input clock signal frequency by a factor of r. The frequency of clock signal within each range according to this configuration is determined by the choice of frequency output by the clock signal generators and indicated by the position of the cross within the range.

The configuration depicted in FIG. 3B is selected in accordance with the demand indication and it can be seen that it satisfies the demand with each leaf clock providing the frequency requested by the corresponding device. In this example, the estimated power consumption is given by the number of clock signal generators indicated as being in use which in this case is three since all three clock signal generators are indicated as being used to produce the required frequencies.

Figure 3C:
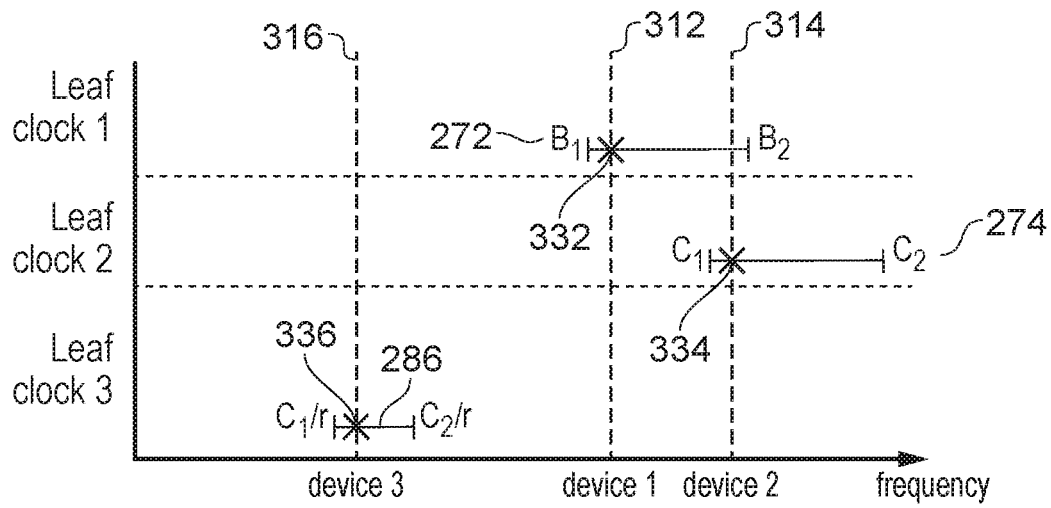

FIG. 3C illustrates an alternative configuration of the clock distribution system 210 of FIG. 2. In this case, leaf clock 1 242 receives its clock signal from clock signal generator B 224 at the frequency indicated by cross 332, leaf clock 2 244 receives its clock signal from clock signal generator C 226 indicated by cross 334, and the clock frequency divider 236 is set to divide its input clock frequency by a factor of r so as to provide leaf clock 3 246 with a clock signal at a frequency indicated by cross 336. The demanded frequencies are such that device 2 and device 3 can be satisfied with clock signal generator C 226 operated at one frequency, that frequency indicated by the position of the crosses 334, 336 in the ranges 274 and 286.

According to the configuration depicted in FIG. 3C, the demand indication is satisfied and only two clock signal generators are indicated as being in use. Therefore, by selecting a configuration based on the estimated power consumption, the configuration of FIG. 3 is selected since it has fewer clock signal generators in use.

Figure 4:
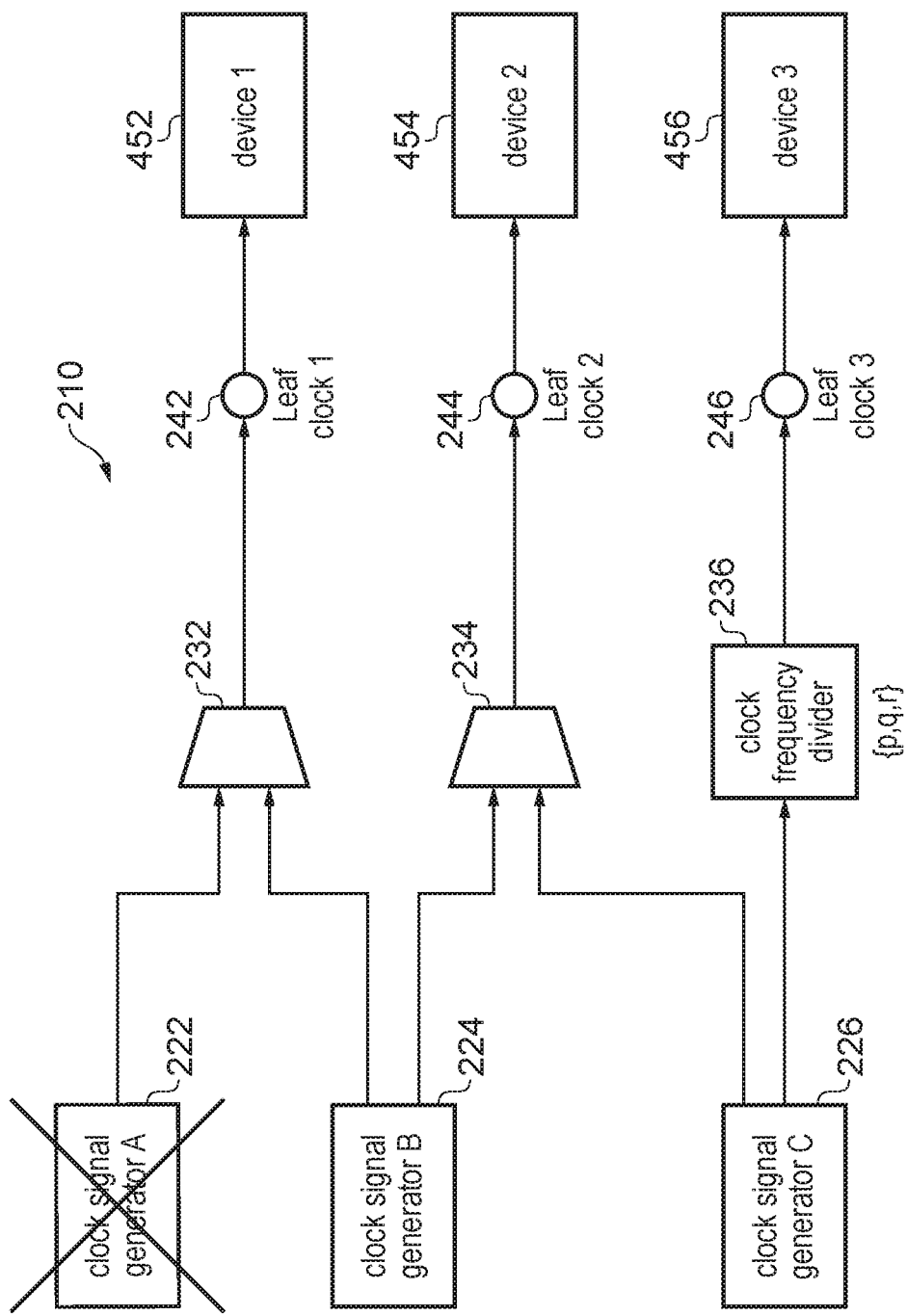
FIG. 4 illustrates the clock distribution system of FIG. 2 according to the configuration of FIG. 3C.

By adopting such a configuration, clock signal generator A 222 can be switched off which results in less power being consumed by the clock distribution system 210 and an overall more energy efficient IC 100 than if this selection were not carried out. FIG. 4 illustrates the clock signal distribution system 210 of FIG. 2 with the configuration of FIG. 3C selected. Clock signal generator A 222 is shown as being switched off and consequently is not drawing the large amount of power that it would have otherwise, and each leaf clock is seen to be supplying its corresponding device 452, 454, 456 with a clock signal that satisfies the demand indication.

Figure 5:
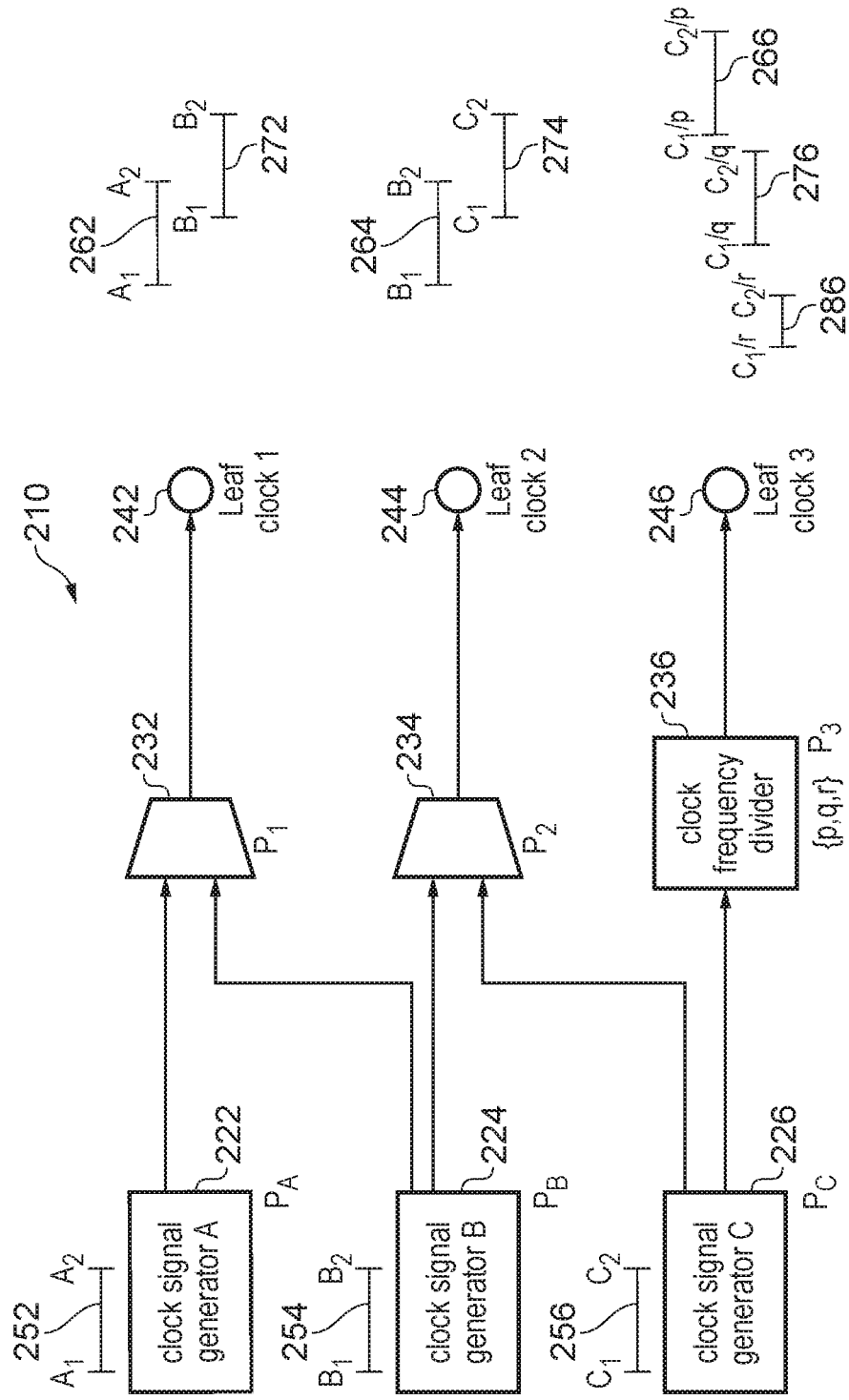
FIG. 5 illustrates the clock distribution system of FIG. 2 with associated component power costs.

Instead of, or in addition to, using the count of clock signal generators as an indication of the power consumption of the clock distribution system 210, components of the clock distribution system 210 may be assigned associated component power costs. An example of this is illustrated in FIG. 5 for which the clock distribution system 210 of FIG. 2 is shown with the power cost of each component depicted next to the component. So it is seen that clock signal generator A 222 has a power cost $P_A$ and multiplexer 232 has a power cost $P_1$. Also, clock frequency divider 236 may have a power cost $P_3$, where $P_3$ could be assumed to be a fixed default value regardless of the particular clock division ratio selected, or alternatively in a more precise approach $P_3$ could be selected from values $P_{3p}$, $P_{3q}$, $P_{3r}$ respectively corresponding to the estimated power cost when each of the clock division ratios p, q, r are selected. The configuration to adopt can then be selected based on the associated component power costs of the components to be used in that configuration (with components having multiple settings potentially having the power cost determined based on the selected setting). In the example configuration depicted in FIG. 3C, this would lead to the estimated power consumption $P_B+P_C+P_1+P_2+P_3$. By selecting the configuration based on the sum or average of the component power costs, a more accurate estimate of the total power consumption can be obtained. It may be that every component has an associated component power cost, alternatively only some components may have a known power cost. For instance, it may be that the component power cost is only known for the components that consume the most power such as clock signal generators, PLLs, or multiplexers/demultiplexers and it is assumed that the effect of the other components is relatively minor. This may make it easier to determine the configuration to select.

Figure 6A:
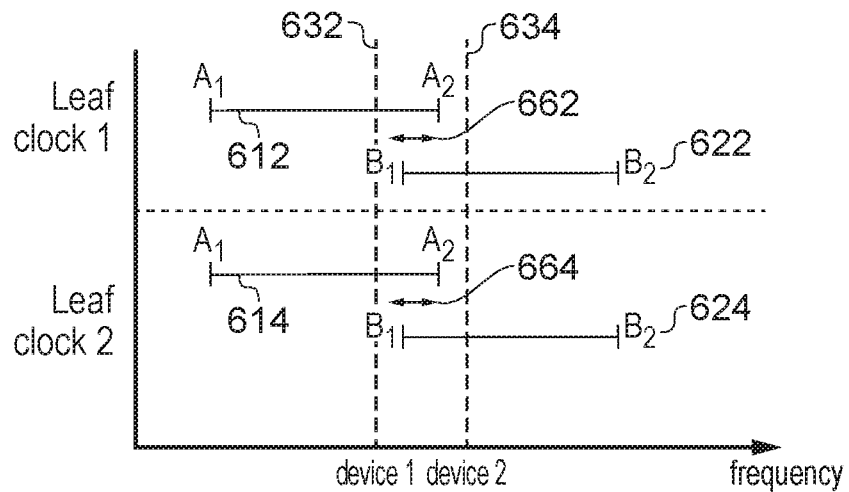
FIGS. 6A-6C illustrate another example of selection of a configuration.
Figure 6B:
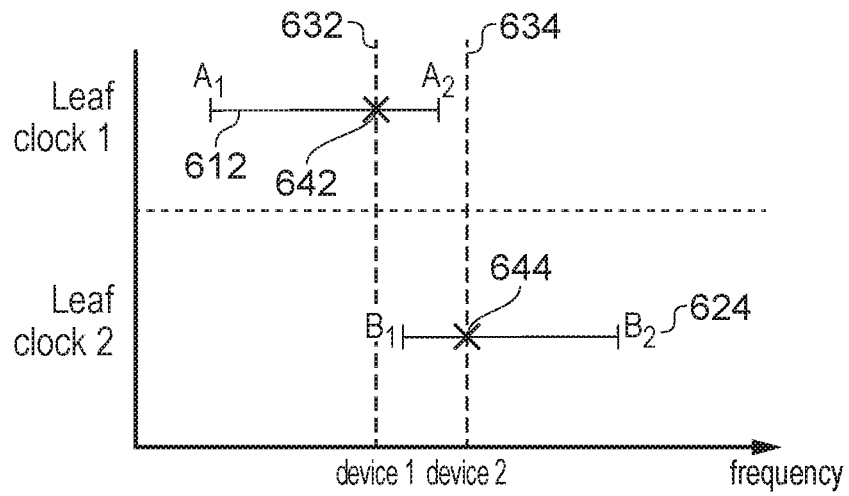
Figure 6C:
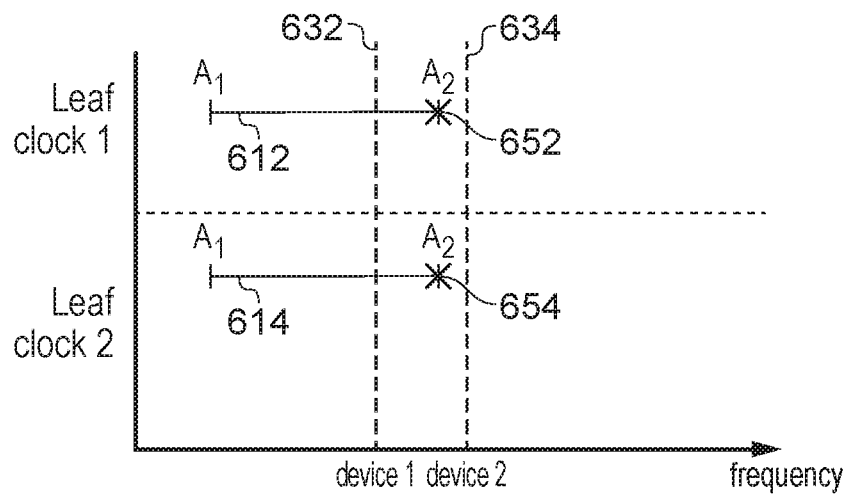

FIGS. 6A-6C illustrate a case in which a configuration that less closely satisfies a demand indication is chosen in preference to a configuration that more closely satisfies a demand indication. In this example, the demand indication for devices 1 and 2 is illustrated by vertical lines 632, 634. However, according to this example, it is taken that the devices are able to operate within a region of tolerance outside of their preferred frequency. Hence, each device could be provided with a frequency of clock signal that is not the frequency indicated by the demand indication.

FIG. 6A illustrates the demand indication for an example clock distribution system and the supported clock frequencies at two leaf clocks. Each leaf clock is capable of providing clock signals in the ranges $[A_1, A_2]$ 612, 614 and $[B_1, B_2]$ 622, 624 as provided by clock signal generators A and B respectively and the ranges are such that for each leaf clock, there is an overlapped range of frequencies 662, 664, that can be supplied according to more than one configuration of the clock distribution system.

FIG. 6B illustrates a possible configuration of such a clock distribution system with the frequencies of clock signals being provided at leaf clocks 1 and 2 being indicated by crosses 642, 644. According to the configuration, each device is provided with a clock signal at the frequency requested. Therefore, the demand indication can be considered to be satisfied well. However, it is seen that according to this configuration, both clock signal generator A and clock signal generator B are indicated as being in use.

FIG. 6C illustrates another possible configuration of the clock distribution system. According to this example, clock signal generator A is providing the clock signal to be delivered to both devices. However, given the constraints of the clock distribution system and the demand indication, it is not possible for clock signal generator to be supplying both devices at the exact frequency demanded. But, because the demand indication indicates that the devices are capable of operating at a frequency within a tolerance region of the demanded frequencies, the configuration depicted in FIG. 6C, in which both leaf clocks can be supplied with clock signals at the same frequency indicated by crosses 652, 654, can be deemed to satisfy the demand indication, albeit not as closely as the configuration illustrated in FIG. 6B. According to some example embodiments, the configuration selected is that of FIG. 6C, the configuration that less closely satisfies the demand indication but has a lower estimated power consumption by virtue of using fewest clock signal generators.

Figure 7:
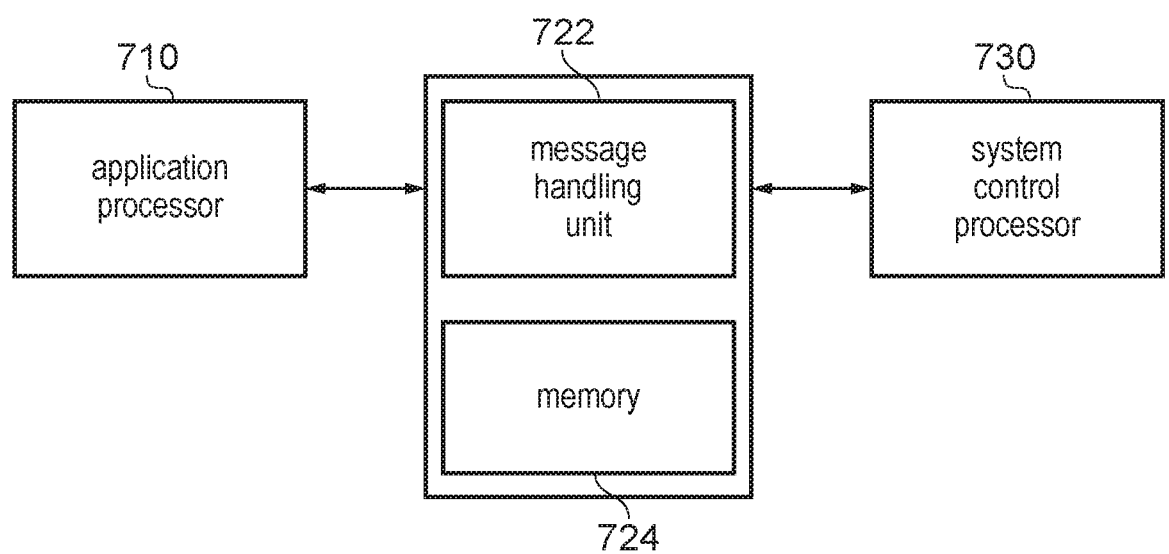
FIG. 7 schematically illustrates a system control processor and its interface with an application processor.

The present technique may be executed in software as part of an OS or alternatively could be executed in dedicated hardware or using a system control processor (SCP) 730 depicted in FIG. 7. The SCP 730 provides a platform for the provision of power management functions and services. As such the SCP 730 may be responsible for tasks related to initialisation and power control of components both within the IC and outside the IC. This means that these tasks can be offloaded from the application processors 710 which may be executing the OS and applications, thus improving the performance of the application processors 710. As shown in FIG. 7, a message handling unit 722, making use of areas of shared memory 724, provides a message interface over which the services provided by the SCP 730 can be exposed to the application processor software with the messages able to indicate the set of clock rates it can synthesise for each leaf clock and provide an interface to allow software on the application processor 710 to select a clock rate for each leaf clock without having to handle the details of the selection of the configuration for the clock distribution system.

Figure 8A:
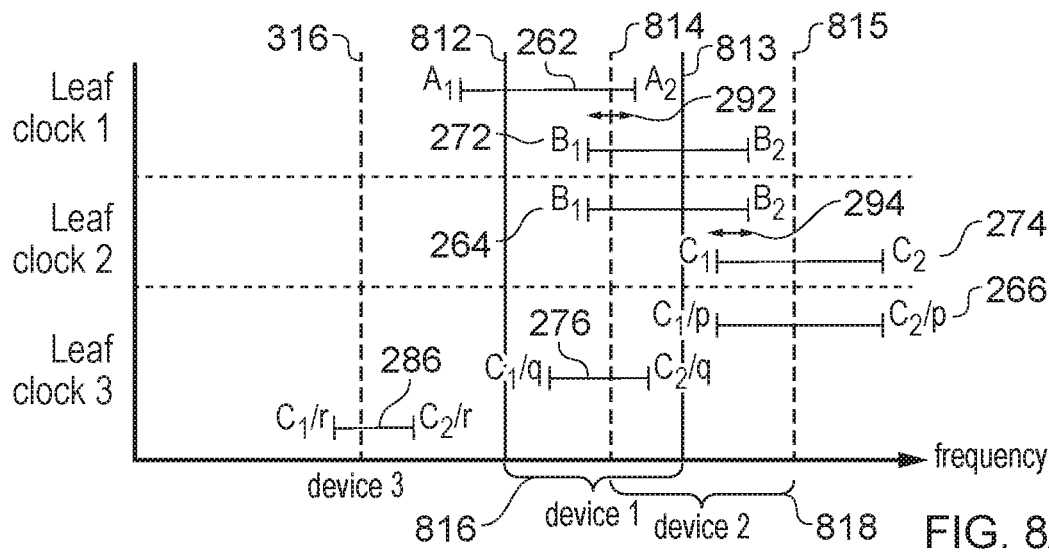
FIGS. 8A-8C illustrate another example of selection of a configuration in the clock system of FIG. 2 with ranges of demanded frequencies.
Figure 8B:
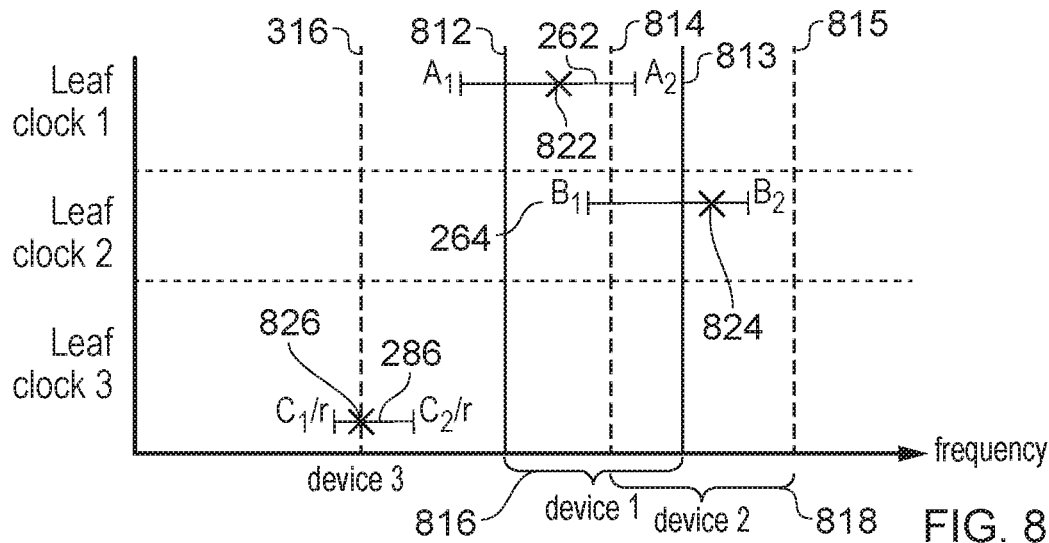
Figure 8C:
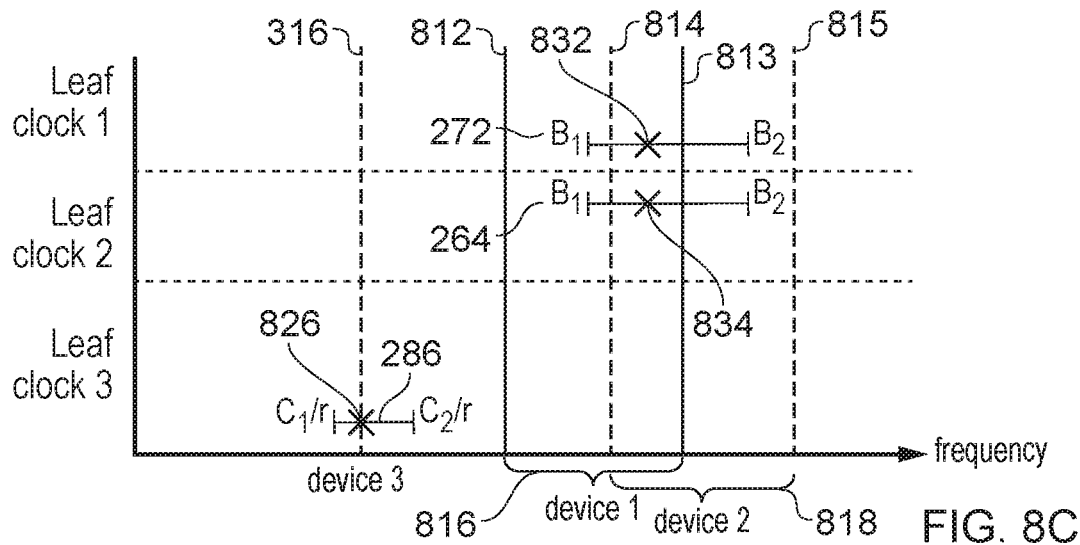

FIGS. 8A-8C illustrate another example of selection of a configuration for the clock distribution system 210 of FIG. 2 according to a different demand indication. The demand indication in this case is expressed for devices 1 452 and 2 454 as a range of frequencies 816, 818 of clock signal, a frequency from which is to be provided to the device. Device 1 452 can handle being provided with a clock signal having a frequency in the range 816 shown by solid vertical lines 812, 813, device 2 454 can support clock signals with frequencies in the range 818 shown by dashed vertical lines 814, 815 and the demand associated with device 3 456 is the frequency illustrated by dashed vertical line 316.

One configuration of the clock distribution system 210 that satisfies the demand indication is indicated in FIG. 8B. According to this configuration, leaf clock 1 242 supplying device 1 452 is provided with a clock signal originating from clock signal generator A 222 selected such that the frequency lies in the range 816 indicated as demanded by device 1 42, as indicated by cross 822. Similarly for leaf clock 2 244, the clock signal originates from clock signal generator B 224 and the frequency is selected to be in the range 818 supported by device 2 454 as indicated by cross 824. And for leaf clock 3 246, the clock frequency divider 236 is set to apply a factor of r to the input frequency with the input frequency chosen to produce the clock frequency requested at device 3 456 as indicated by cross 826.

FIG. 8C illustrates another configuration of the clock distribution system 210, this configuration making use of the common range in the demanded frequencies of devices 1 452 and 2 454 to provision leaf clocks 1 242 and 2 244 using the same clock signal generator 224. By setting the multiplexers 232, 234 so as to provide leaf clocks 1 242 and 2 244 with the clock signal generated at clock signal generator B 224, a frequency can be chosen to be supplied by clock signal generator B 224 that satisfies the demands of both device 1 452 and device 2 454, as indicated by crosses 832, 834, since the ranges of their demanded frequencies share a common range. Hence, according to the configuration of FIG. 8C, clock signal generator A 222 can be indicated as being able to be put into a power-saving state, an example of which may be switching it off. In this way an energy efficient configuration of the clock distribution system 210 can be selected.

Figure 9:
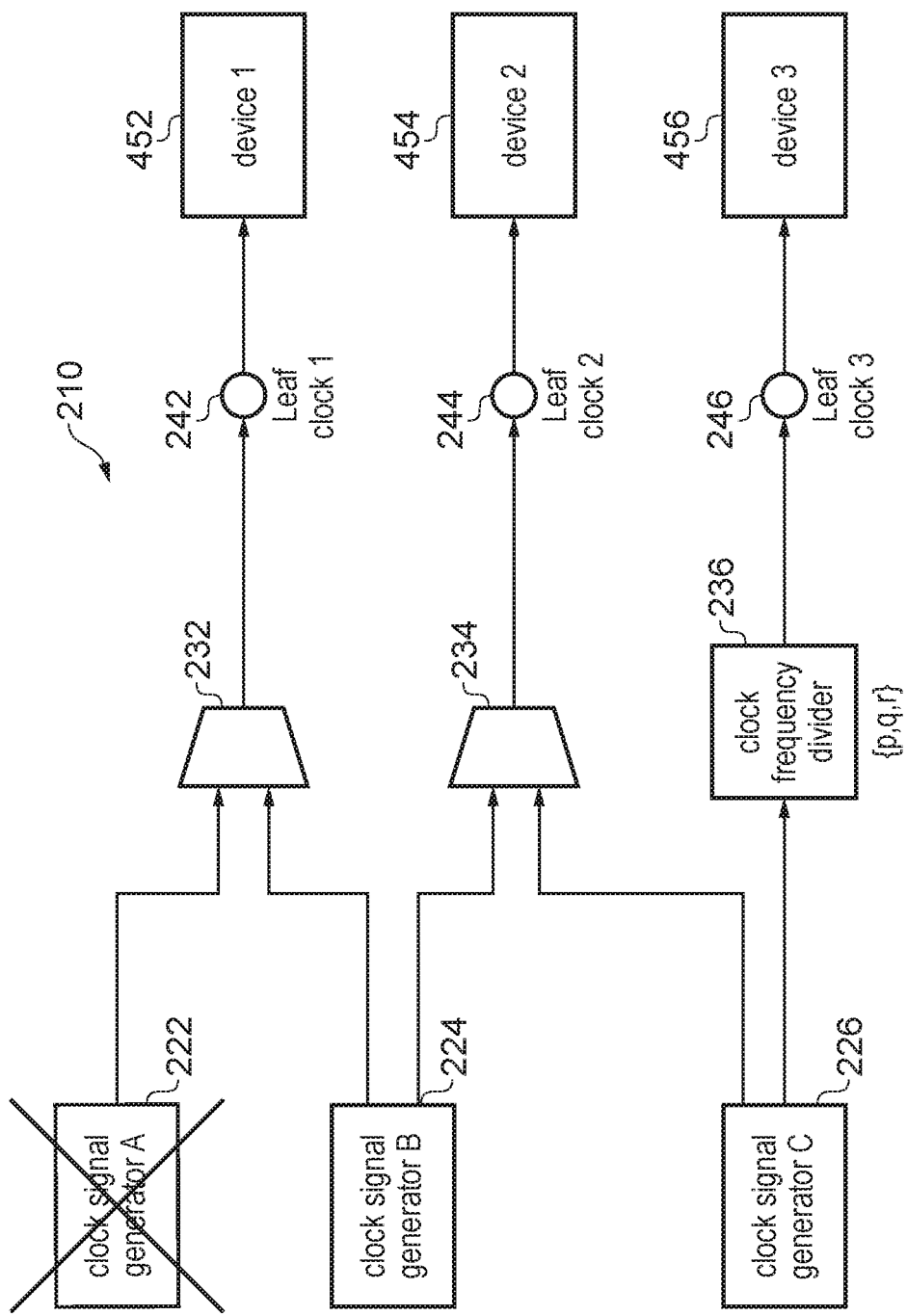
FIG. 9 illustrates the clock distribution system of FIG. 2 according to the configuration of FIG. 8C.

FIG. 9 illustrates the clock signal distribution system 210 of FIG. 2 according to the configuration selected in FIG. 8C. According to this configuration, clock signal generator A 222 has been indicated as being switched off, reducing the power consumption of the clock distribution system 210.

The examples discussed above show overlaps 292, 294, 642, 644 in the frequency ranges supported in different configurations of the clock distribution system, where the different configurations differ in terms of which generator is used to supply the clock signal to a given leaf clock. However, it is also possible that such overlaps similar to 292, 294, 642, 644 could arise due to other differences in clock configuration, such as differences in the selection of input/output paths by multiplexers or demultiplexers, different multiplication or division ratios applied by a clock multiplier or divider, or different setting of a phase locked loop, for example.

Figure 10A:
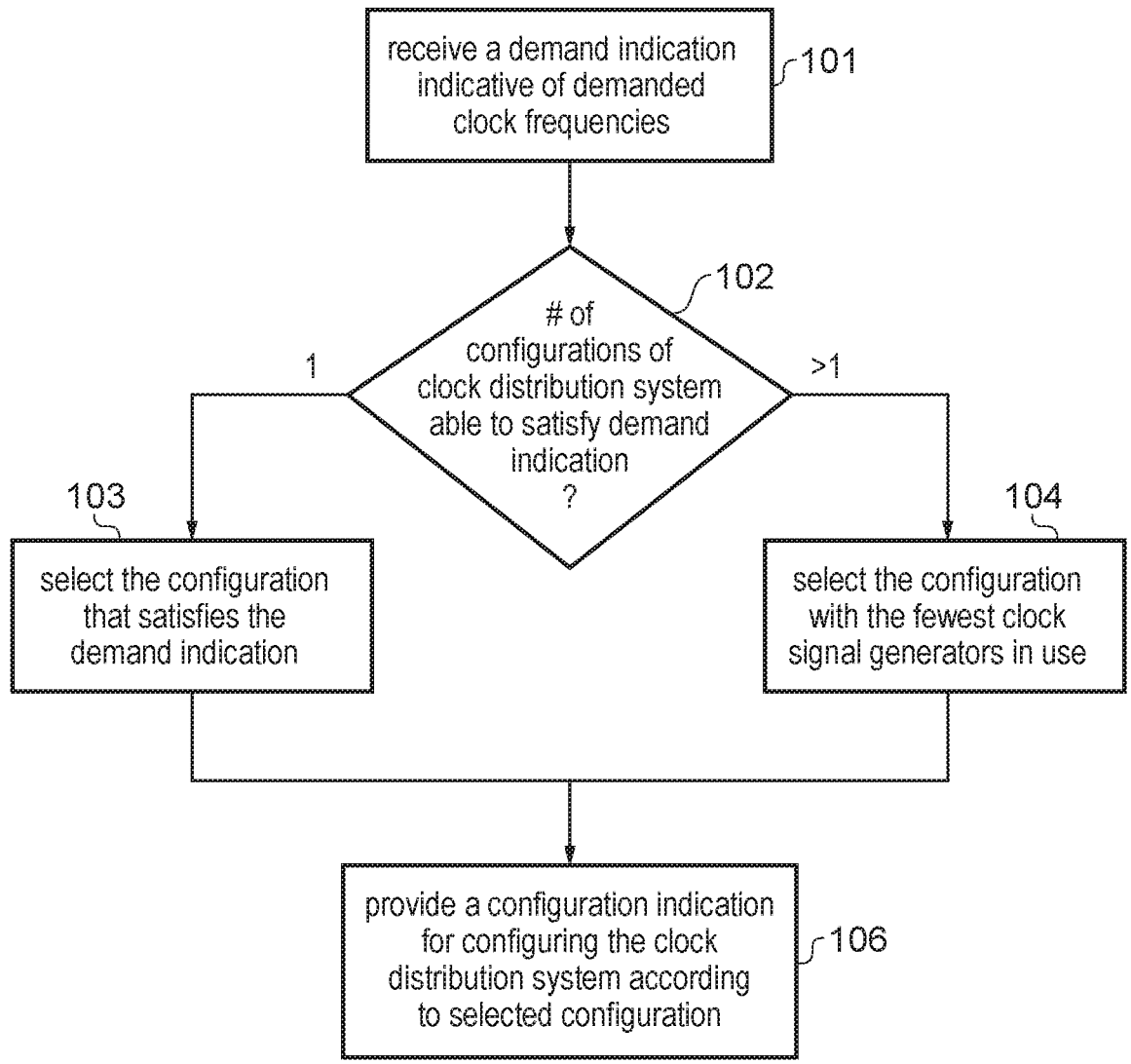
FIGS. 10A-10B are flow diagrams illustrating a method of configuring a clock distribution system.

FIG. 10A is a flowchart showing an example embodiment of the present technique with the number of signal generators in use being used to define the estimated power consumption. At step 101, a demand indication is received indicative of demanded clock frequencies. As discussed, this may for example be in the form of specified frequencies, ranges of frequencies, or a mode of operation (or indication of which devices need to be active), where the indicated mode or active devices can be pre-assigned associated frequencies required to be supported.

At step 102, it is determined whether there is more than one configuration that satisfies the demand indication. By inspecting the different possible configurations of the clock distribution system, it can be determined which of the possible configurations provide the devices with clock signals that satisfy the demand indication. As discussed above, the configurations may be able to satisfy the demand indication to greater or lesser degrees in some example embodiments.

If at step 102 it was determined that there was only one configuration that satisfied the demand indication, at step 103 the configuration that satisfies the demand indication is selected.

If at step 102 it was determined that there was more than one configuration that satisfied the demand indication, at step 104 according to the embodiment represented in FIG. 10A, the configuration that indicates that the fewest clock signal generators are in use is selected. This provides a quick way to determine the configuration to select and since the clock signal generators often consume a large amount of power compared to the other components in the clock distribution system, it can provide a good estimate as to the most energy efficient configuration.

If at step 102 it was determined that there were no configurations that satisfied the demand indication (not pictured), according to some example embodiments, the configuration that comes closest to satisfying the demand indication is selected.

At step 106, a configuration indication for configuring the clock distribution system according to the selected configuration is then provided. This provides the instructions to effect the selected configuration of clock system components in the clock distribution system. The configuration indication may come in the form of a list of settings for the individual components that comprise the clock distribution system, instructing them as to how to be configured, e.g. by providing control signals to control which input path or output path is selected by a multiplexer or demultiplexer, which frequency is to be generated by a clock signal generator or PLL, or which multiple or division ratio is to be selected by a clock multiplier or divider. Alternatively, the configuration indication may indicate one of a number of predetermined states from which the settings of the components can be derived.

Figure 10B:
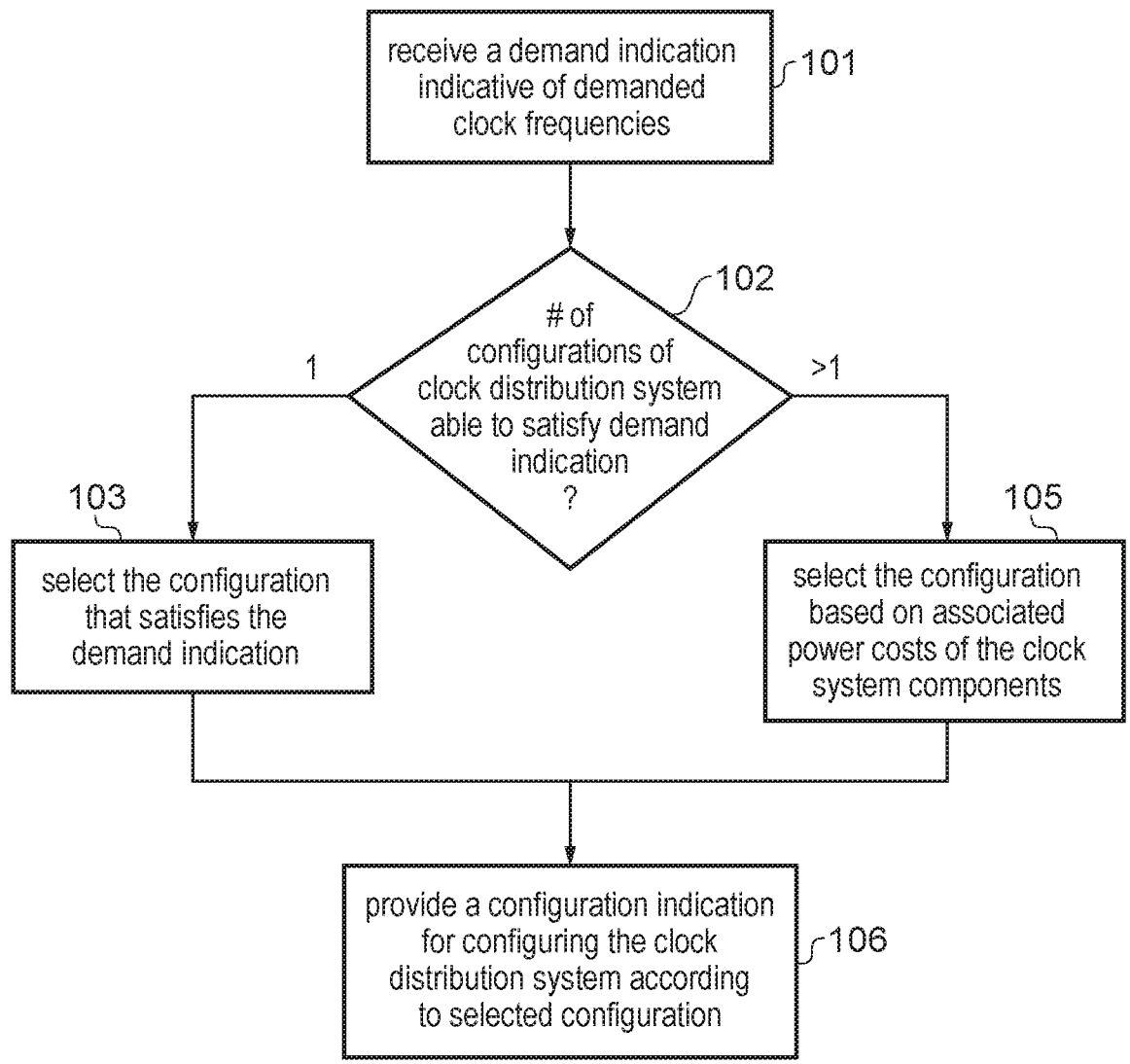

FIG. 10B is a similar flowchart to that of FIG. 10A, but in this case illustrates an example embodiment in which the estimated power consumption is based on the associated power costs of the clock system components. Hence, step 104 of FIG. 10A has been replaced by step 105 which specifies that the configuration is selected based on associated power costs of the clock system components. This may involve summing all of the individual component power costs of the components indicated as being used in the configuration, or components may have a different power costs associated with being in use or not in use and so which costs to include in the sum is based on whether it is indicated as being in use or not. Also, the particular setting to be made for a given clock system component may be considered in selecting the associated power cost for that clock system component.

Figure 11:
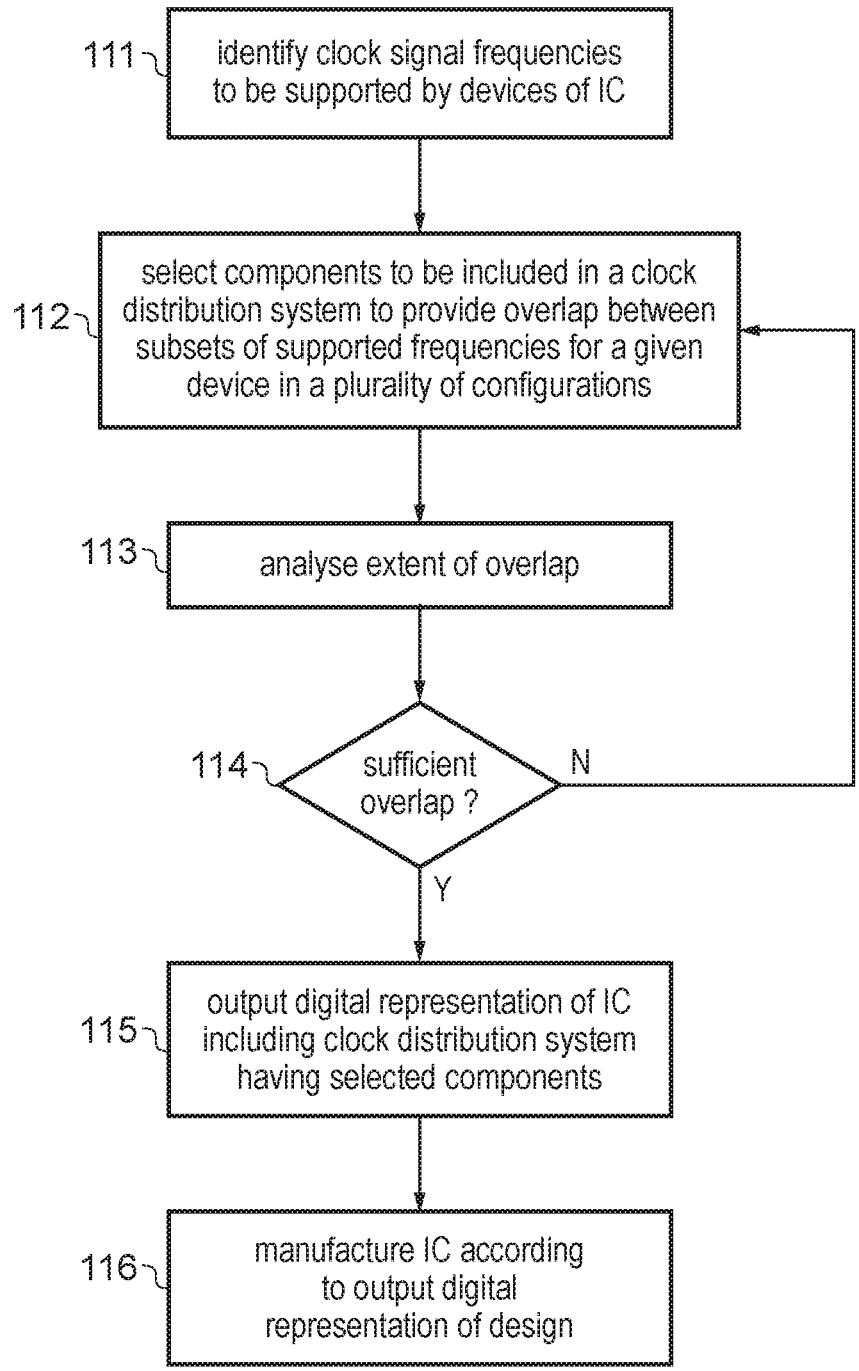
FIG. 11 is a flow diagram illustrating a method of generating a digital representation of a design for an integrated circuit.

As illustrated above, overlap in the clock frequencies supported for a given device according to more than one configuration may lead to more different configurations that are capable of satisfying a demand indication. Therefore, it can be beneficial to design an integrated circuit such that some redundancy is provided in the number of configurations that can support a given frequency for a given device as, by providing this redundancy, there may be more scope to select an energy efficient configuration for the clock distribution system. FIG. 11 is a flowchart specifying a process that makes use of this realisation.

In step 111, clock signal frequencies to be supported by the devices of the IC are identified. This may involve determining which devices are to be provided on the IC and determining the clock signal frequencies that may be demanded by such devices.

At step 112, the components to be included in a clock distribution system are selected to provide overlap between subsets of supported frequencies for a given device in a plurality of configurations. This may involve the counter-intuitive step of providing more clock system components than it would be expected are necessary so as to lead to the presence of more configurations that can supply devices with certain frequencies. This may also involve rearranging the components already provided in such a way that they are able to provide more overlap.

The extent of overlap is then analysed in step 113. This may be done by evaluating the possible configurations of the clock distribution system and determining the frequencies that it can support for each device. If there is sufficient overlap, the process proceeds to step 115, otherwise, it iterates over steps 112, 113, selecting components and analysing overlap until it is deemed that there is a sufficient overlap.

At step 115, a digital representation of the IC including the clock distribution system having the selected components is output. This can then be used at step 116 to manufacture the IC according to the output digital representation of the design.

The term "computer-readable medium", as used herein, generally refers to any form of device, carrier, or medium capable of storing or carrying computer-readable instructions. Examples of computer-readable media include transmission-type media, such as carrier waves, and non-transitory-type media, such as magnetic-storage media (e.g. hard disk drives, tape drives, and floppy disks), optical-storage media (e.g. Compact Discs (CDs), Digital Video Discs (DVDs), and Blu-Ray discs), electronic-storage media (e.g. solid-state drives and flash media), and other distribution systems.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Method for configuring a clock distribution system for an integrated circuit, the method comprising the steps:
   receiving a demand indication indicative of demanded clock frequencies for clock signals to be supplied to one or more devices of the integrated circuit;
   selecting a selected configuration of the clock distribution system in accordance with the demand indication; and
   providing a configuration indication for configuring the clock distribution system according to the selected configuration; in which
   when a plurality of configurations of the clock distribution system are able to satisfy the demand indication, the selected configuration is selected from said plurality of configurations based on an estimated power consumption associated with said plurality of configurations.

2. Method according to claim 1, wherein
the configuration indication indicates whether at least one clock system component of the clock distribution system is to be put into a power-saving state.

3. Method according to claim 1, wherein
the configuration selected as the selected configuration from the plurality of configurations is the configuration with the lowest estimated power consumption.

4. Method according to claim 1, wherein
for at least one of the plurality of configurations, the estimated power consumption is based on a number of clock signal generators indicated as being used according to the configuration.

5. Method according to claim 4, wherein
the selected configuration selected from the plurality of configurations is a configuration that indicates the fewest clock signal generators as being in use; and
the configuration indication indicates that at least one clock signal generator unused in the selected configuration is to be put into a power-saving state.

6. Method according to claim 1, wherein
for at least one of the plurality of configurations, the estimated power consumption is based on component power costs of clock system components of the clock distribution system indicated as being used according to the configuration.

7. Method according to claim 1, wherein
the configuration indication indicates settings for clock system components of the clock distribution system, the clock system components comprising at least one clock signal generator and at least one clock distribution component.

8. Method according to claim 7, wherein
the at least one clock distribution component comprises at least one of: a multiplexer, a demultiplexer, a phase-locked loop, a clock frequency multiplier, and a clock frequency divider.

9. Method according to claim 1, wherein
when selecting between a first configuration which more closely satisfies the demand indication but is associated with a higher estimated power consumption and a second configuration which less closely satisfies the demand indication but is associated with a lower estimated power consumption, the selected configuration selected is the second configuration.

10. Method according to claim 1, wherein
said plurality of configurations of the clock distribution system able to satisfy the demand indication comprise two or more configurations for which at least one frequency of clock signal is able to be supplied to a given device of the integrated circuit in each of said two or more configurations.

11. Method according to claim 1, wherein
the method is executed by a system control processor separate from an application processor for processing general-purpose software.

12. Method according to claim 1, wherein
the demand indication is received from an operating system or a device driver.

13. Method according to claim 1, wherein
the demand indication is indicative of a range of clock frequencies for clock signals to be supplied to each device of the integrated circuit.

14. Non-transitory computer readable medium storing instructions that when executed by a computer system cause the computer system to perform the method of claim 1.

15. Apparatus for configuring a clock distribution system for an integrated circuit, the apparatus comprising:
receiving circuitry to receive a demand indication indicative of demanded clock frequencies for clock signals to be supplied to one or more devices of the integrated circuit;
selecting circuitry to select a selected configuration of the clock distribution system in accordance with the demand indication; and
output circuitry to provide a configuration indication for configuring the clock distribution system according to the selected configuration; wherein
when a plurality of configurations of the clock distribution system are able to satisfy the demand indication, the selecting circuitry is configured to select the selected configuration from said plurality of configurations based on an estimated power consumption associated with said plurality of configurations.

* * * * *